United States Patent
Glugla et al.

(10) Patent No.: US 9,677,498 B2
(45) Date of Patent: Jun. 13, 2017

(54) VARIABLE DISPLACEMENT ENGINE CONTROL SYSTEM AND METHOD

(71) Applicant: Ford Global Technologies, LLC, Dearborn, MI (US)

(72) Inventors: Chris Paul Glugla, Macomb, MI (US); Garlan J. Huberts, Milford, MI (US); Michael Damian Czekala, Canton, MI (US); Nelson William Morrow, Jr., Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 856 days.

(21) Appl. No.: 13/896,059

(22) Filed: May 16, 2013

(65) Prior Publication Data

US 2014/0343827 A1    Nov. 20, 2014

(51) Int. Cl.
| | |
|---|---|
| *F02P 9/00* | (2006.01) |
| *F02D 43/00* | (2006.01) |
| *F02D 41/00* | (2006.01) |
| *F02P 3/045* | (2006.01) |
| *F02P 5/15* | (2006.01) |
| *F02D 37/02* | (2006.01) |

(52) U.S. Cl.
CPC ............ *F02D 43/00* (2013.01); *F02D 37/02* (2013.01); *F02D 41/0087* (2013.01); *F02P 3/045* (2013.01); *F02P 5/1504* (2013.01); *Y02T 10/46* (2013.01)

(58) Field of Classification Search
CPC ...... F02D 43/00; F02D 41/0087; F02D 37/02; F02P 3/045; F02P 5/1504
See application file for complete search history.

(56) References Cited

U.S. PATENT DOCUMENTS

| | | | |
|---|---|---|---|
| 7,225,782 | B2 | 6/2007 | Pallett et al. |
| 7,302,932 | B2 | 12/2007 | Shelby et al. |
| 2011/0220068 | A1* | 9/2011 | Ferch ...................... F02D 17/02 123/481 |
| 2012/0104767 | A1 | 5/2012 | Gibson et al. |
| 2012/0104768 | A1 | 5/2012 | Gibson et al. |
| 2012/0285161 | A1 | 11/2012 | Kerns et al. |
| 2012/0325190 | A1 | 12/2012 | Brandes et al. |
| 2014/0316673 | A1* | 10/2014 | Glugla .................... F02P 3/051 701/102 |

FOREIGN PATENT DOCUMENTS

EP              1612393 A1      1/2006

* cited by examiner

*Primary Examiner* — Hieu T Vo
*Assistant Examiner* — Arnold Castro
(74) *Attorney, Agent, or Firm* — Julia Voutyras; McCoy Russell LLP (57) ABSTRACT

Methods and systems are provided for adjusting an ignition energy provided to an engine cylinder upon reactivation from a VDE mode of operation. Ignition energy is increased by increasing an ignition coil dwell time and/or an ignition coil strike frequency. The increased ignition energy improves combustion stability during the transition out of the VDE mode of operation.

19 Claims, 4 Drawing Sheets

VARIABLE DISPLACEMENT ENGINE CONTROL SYSTEM AND METHOD

FIELD

The present application relates to adjusting ignition energy when operating a variable displacement internal combustion engine (VDE).

BACKGROUND AND SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). In some examples, a portion of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves, or through the control of a plurality of selectively deactivatable fuel injectors that affect cylinder fueling. When transitioning between a VDE mode (where one or more cylinders are deactivated) and a non-VDE mode (where all the cylinders are active), the control system may adjust one or more engine operating parameters to reduce disturbances (e.g., torque disturbances) and attenuate the disturbance during the transition.

One example approach for engine control during a VDE transition is shown by Pallett et al in U.S. Pat. No. 7,225,782. Therein, the VDE engine is coupled in a hybrid electric vehicle having an electric motor. When enabling or disabling a cylinder, torque from the motor is varied to compensate for transient changes in engine output torque caused by the enabling or disabling of the cylinder.

However the inventors herein have identified potential issues with such an approach. As one example, combustion stability may be degraded during the transition. Specifically, when transitioning from the VDE mode (or partial cylinder mode) to the non-VDE mode (or full cylinder mode), cylinder load decreases based on the decrease in aircharge. The lighter cylinder loads generally have less stable combustion and the interaction with the transient fuel compensation, and other cylinder conditions that are different than the operating cylinders due to cooling during deactivation may contribute to less stable combustion during reactivation. If the engine is equipped for exhaust gas recirculation, EGR control used during the transition, it may exacerbate the combustion issues. In particular, the EGR may continue to interfere with the lighter cylinder load until the EGR delivered to the cylinders has been sufficiently bled down to reduce combustion issues. In some embodiments, charge motion control valves (CMCVs) may be used to adjust the in cylinder motion of the air fuel mixture delivered to the cylinder during the transition. High cylinder motion results in better mixing, and more stable combustion. However, due to the slower response time of the CMCV (e.g., the CMCV not shutting quickly enough when transitioning to the lower cylinder load), combustion stability may be compromised. The poor combustion conditions can also lead to slow burns or even misfires. Overall, combustion stability and engine performance may be degraded.

In one example, the above issues may be at least partly addressed by a method for an engine comprising: selectively deactivating one or more engine cylinders responsive to operating conditions, and during reactivation of the cylinders, adjusting ignition energy of the reactivated cylinders for a number of combustion events. Specifically, the ignition energy may be temporarily increased during the reactivation. In this way, combustion stability is improved and torque disturbances are reduced during a transition out of a VDE mode of operation.

In one example, a variable displacement engine may be configured with selectively deactivatable fuel injectors. In response to selected deactivation conditions, such as reduced engine load or torque demand, one or more cylinders may be deactivated and the engine may be operated in a VDE mode. For example, the engine may be operated with half the cylinders deactivated. During the deactivation, an ignition energy of the active cylinders may be adjusted based on the engine speed-load conditions. Then, in response to selected reactivation conditions, such as increased engine load or torque demand, the deactivated cylinders may be reactivated and the engine may resume a non-VDE mode. During the reactivation, for a number of combustion events since the reactivation, the ignition energy of the cylinders may be increased. For example, the dwell time of the ignition coil may be increased. Additionally or optionally, a number of strikes of the ignition coil may be increased. After a number of combustion events, a nominal ignition energy may be resumed.

In some embodiments, such as where the engine was operating with EGR during the VDE mode of operation, the increasing of the ignition energy during the reactivation may be adjusted based on the EGR. Specifically, the ignition energy may be increased while the EGR is bled down. By using a higher ignition energy at the time of reactivation, a higher EGR rate can be used in VDE mode because the EGR can be bled down from this higher rate and the transition to the lower cylinder load can be advanced without degrading combustion. Alternatively, the transition to cylinder reactivation can be performed at a higher EGR level during the EGR bleed down period than would have been possible without the enhanced ignition output, reducing the delay time before transition to cylinder reactivation.

In this way, by selectively increasing the ignition energy during the reactivation of engine cylinders, combustion stability is improved during a transition from VDE mode to non-VDE mode of engine operation. The increased ignition energy also renders torque disturbances during the transition substantially imperceptible to the vehicle operator. By increasing the ignition energy temporarily, rather than using a high ignition output continuously during all engine operating conditions, component durability issues resulting from the high heat output are reduced. Further, the life of spark plug components, such as the ignition electrodes, is prolonged. Additionally, transition to cylinder reactivation can be performed during a higher EGR level during the EGR bleed down phase, improving the response time of reactivation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
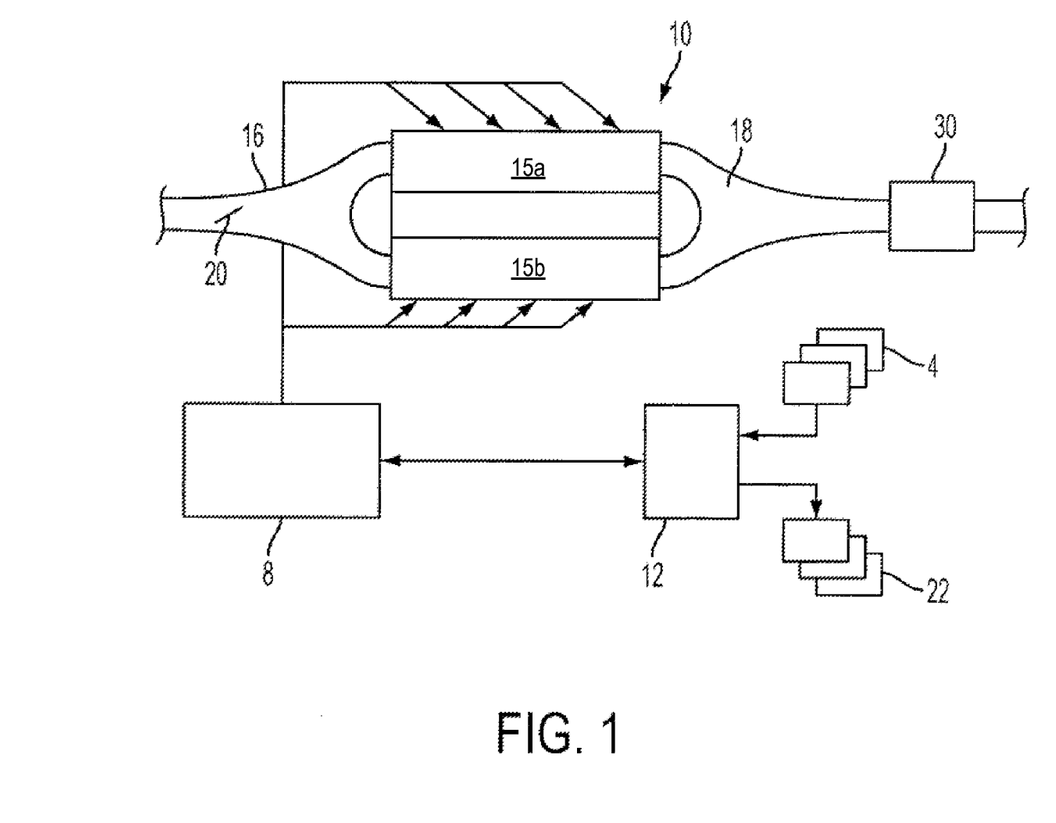
FIG. 1 shows an example engine and exhaust system layout.
Figure 2:
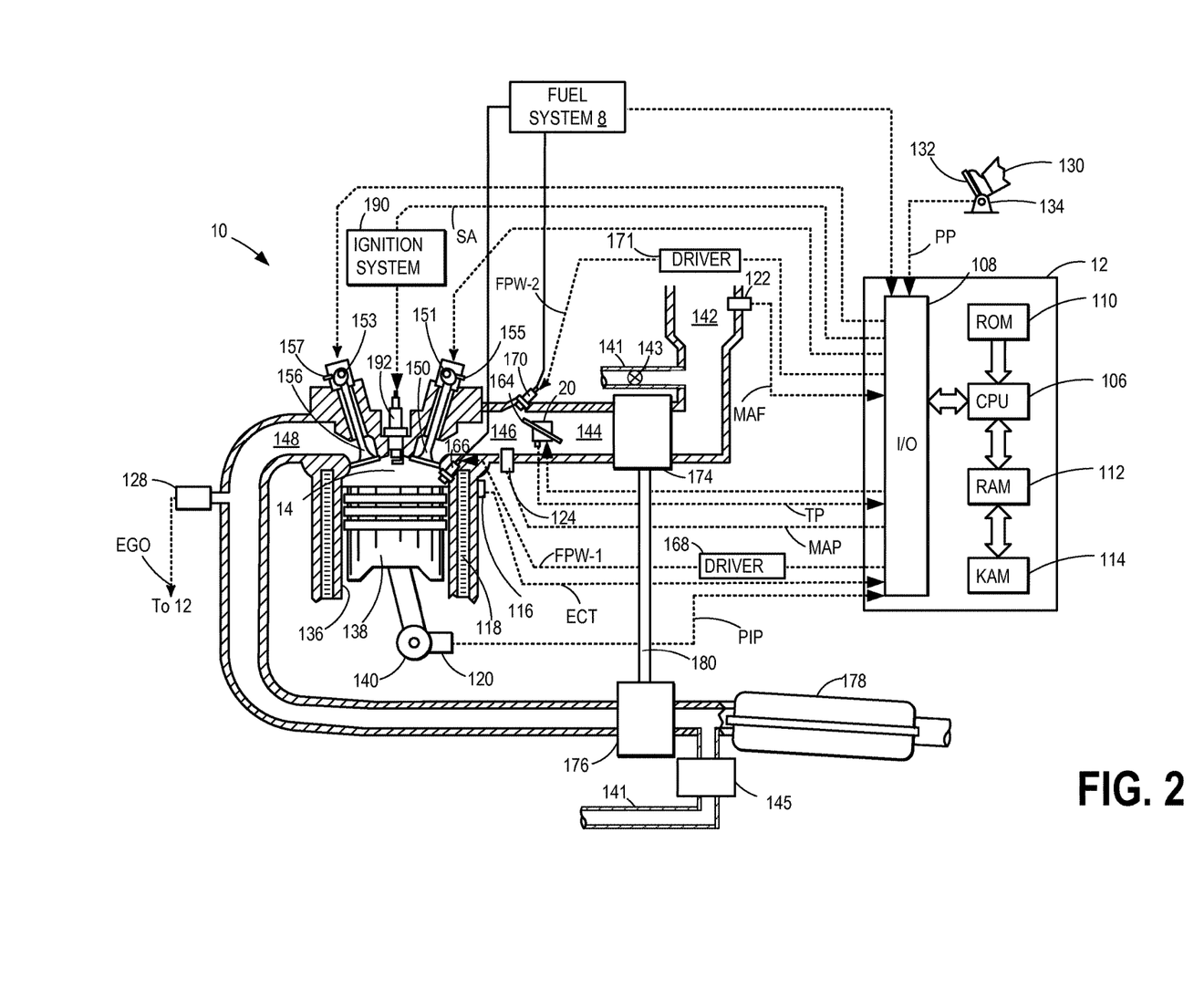
FIG. 2 shows a partial engine view.

The following description relates to systems and methods for adjusting ignition output in cylinders of a variable displacement engine (VDE), such as the engine system of FIGS. 1-2. An engine control system may perform a control routine, such as the example routine of FIG. 3, to temporarily increase the ignition energy for a number of combustion events during cylinder reactivation (that is, during a transition out of a VDE mode of operation). The ignition energy may be increased via adjustments to an ignition strike frequency (multiple spark events in a combustion cycle) and/or an ignition coil dwell time. The ignition energy may be further adjusted based on EGR delivery to the engine during the transition. An example adjustment is shown with reference to FIG. 4. In this way, by modulating the ignition energy to a cylinder during cylinder deactivation and reactivation, combustion stability is improved and torque disturbances are reduced.

FIG. 1 shows an example variable displacement engine (VDE) 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

During selected conditions, such as when the full torque capability of the engine is not needed, one of a first or a second cylinder group may be selected for deactivation (herein also referred to as a VDE mode of operation). Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

In alternate examples, engine system 10 may have cylinders with selectively deactivatable intake and/or exhaust valves. Therein, the cylinder valves may be selectively deactivated via hydraulically actuated lifters (e.g., lifters coupled to valve pushrods), or via a cam profile switching mechanism in which a cam lobe with no lift is used for deactivated valves.

Cylinders may be grouped for deactivation in a bank-specific manner. For example, in FIG. 1, the first group of cylinders may include the four cylinders of the first bank 15a while the second group of cylinders may include the four cylinders of the second bank 15b. In an alternate example, instead of one or more cylinders from each bank being deactivated together, two cylinders from each bank of the V8 engine may be selectively deactivated together.

As such, when the active cylinders are operated at the higher cylinder load during the VDE mode of operation, an ignition energy delivered to the active cylinders may be adjusted based on the engine speed-load conditions. For example, in the VDE mode, as the engine speed-load required from the still active cylinders increases, the ignition energy may be increased. When the deactivated cylinders are subsequently reactivated, each cylinder's load may be lowered. As elaborated herein with reference to FIG. 3, for a number of combustion events since the reactivation, the ignition energy to the reactivated cylinders may be increased to reduce combustion issues associated with the transition.

Engine 10 may operate on a plurality of substances, which may be delivered via fuel system 8. Engine 10 may be controlled at least partially by a control system including controller 12. Controller 12 may receive various signals from sensors 4 coupled to engine 10 (and described with reference to FIG. 2), and send control signals to various actuators 22 coupled to the engine and/or vehicle (as described with reference to FIG. 2). The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Fuel system 8 may be further coupled to a fuel vapor recovery system (not shown) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

Figure 3:
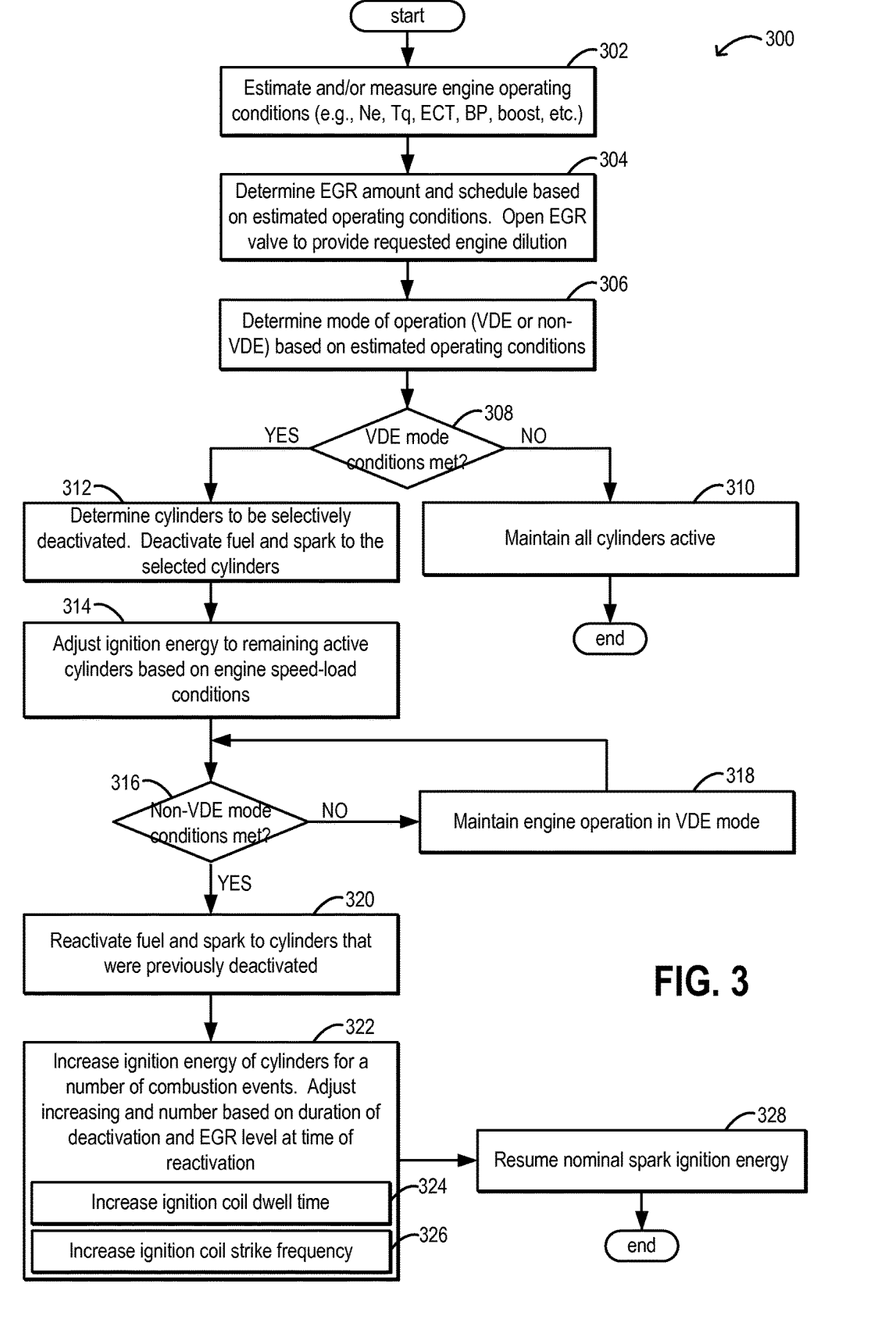
FIG. 3 shows a high level flow chart for adjusting ignition energy during a transition between VDE and non-VDE modes of engine operation.

Now turning to FIG. 3, an example routine 300 is shown for adjusting ignition energy to an engine cylinder during a transition between VDE and non-VDE modes. By adjusting the ignition energy, torque disturbances during the transition can be better addressed.

At 302, the routine includes estimating and/or measuring engine operating conditions. These may include, for example, engine speed, desired torque (for example, from a pedal-position sensor), manifold pressure (MAP), manifold air flow (MAF), BP, engine temperature, catalyst temperature, intake temperature, spark timing, air temperature, knock limits, etc.

At 304, an amount of exhaust gas recirculation (EGR) required may be determined based on the estimated operating conditions and the amount of available ignition energy during light load conditions (VDE to non-VDE operation For example, based on the operating conditions, an amount of engine dilution required may be determined, and an amount of EGR that can provide the desired dilution may be calculated. Based on the amount of EGR desired, an opening of an EGR valve in an EGR passage coupling the engine exhaust to the engine intake may be determined. The EGR valve may then be opened to the determined position to provide the desired dilution.

At 306, based on the estimated operating conditions, the routine may determine an engine mode of operation (e.g., VDE or non-VDE). For example, if the torque demand is low, the controller may determine that one or more cylinders can be deactivated while the torque demand is met by the remaining active cylinders. In comparison, if the torque demand is high, the controller may determine that all the cylinders need to remain active.

At 308, it may be confirmed if VDE conditions are met. In one example, cylinder deactivation conditions may be confirmed when torque demand is less than a threshold. If cylinder deactivation conditions are confirmed, a VDE mode is selected. If cylinder deactivation conditions are not confirmed, at 310, the routine includes maintaining all the cylinders active and combusting.

If cylinder deactivation conditions and a VDE mode of operation are confirmed, then at 312, the routine includes selecting a group of cylinders and/or an engine bank to deactivate based on the estimated engine operating conditions. The selection may be based on, for example, which group of cylinders was deactivated during a previous VDE mode of operation. For example, if during the previous cylinder deactivation condition, a first group of cylinders on a first engine bank were deactivated, then a controller may select a second group of cylinders on a second engine bank for deactivation during the present VDE mode of operation. As another example, the selection may be based on a regeneration state of a first exhaust catalyst (or emission control device) coupled to the first bank relative to the regeneration state of a second exhaust catalyst (or emission control device) coupled to the second bank.

Following the selection, also at 312, the controller may selectively deactivate one or more engine cylinders. As used herein, the deactivation may include selectively deactivating (e.g., turning off) a fuel injector of the selected one or more engine cylinders. While deactivating fuel injection to the selected group of cylinders, the controller may continue to operate (e.g., open or close) intake and exhaust valves of the deactivated cylinders so as to flow air and/or exhaust gases through the deactivated cylinders. In one example, where the engine is a V8 engine, during a VDE mode, the engine may be operated with one group of cylinders activated (that is, in a V4 mode) while during the non-VDE mode, the engine may be operated with both groups of cylinders activated (that is, in a V8 mode).

At 314, during the selective deactivation, ignition energy of the remaining active engine cylinders may be adjusted based on operating conditions. Specifically, each of the remaining active engine cylinders may be operated at a higher engine load to compensate for the deactivation of one or more engine cylinders. The ignition energy of the active cylinders may be adjusted based on the cylinder load. For example, the ignition energy may be increased or decreased based on the engine speed-load conditions.

It will be appreciated that, optionally, during the selective deactivation, an amount of exhaust gas recirculated to the active cylinders may be increased. This is because during the higher cylinder load conditions, a higher amount of exhaust residuals may be tolerated before combustion stability issues arise.

As such, the engine may continue to be operated in the VDE mode with one or more engine cylinders deactivated until reactivation conditions are met. In one example, reactivation conditions may be met when the engine torque demand increases above a threshold. In another example, reactivation conditions may be considered met when the engine has operated in the VDE mode for a specified duration. At 316, non-VDE conditions may be confirmed. If non-VDE conditions are not confirmed, the engine may continue to be operated in the VDE mode.

Upon confirming non-VDE conditions, at 320, the deactivated cylinders may be reactivated. Specifically, the deactivated fuel injectors may be reactivated. In addition, spark to the cylinders may also be reactivated. As such, when the cylinders are reactivated, due to more cylinders being available for combustion, the aircharge and therefore the load to each cylinder is reduced. The lighter load can result in a potential for less stable combustion due to the lighter load and the interaction with transient fuel compensation. For example, the engine may be configured with a charge motion control valve, or CMCV. The engine controller may command the CMCV shut when transitioning from a VDE mode (e.g., V4 mode) to a non-VDE mode (e.g., V8 mode) to increase the in cylinder motion. However, since the CMCV is vacuum actuated, the slow response time involved in shutting the CMCV can result in poor combustion and even cylinder misfires. While an electrically operated CMCV may help with combustion since it can transition faster, it may not be completely robust to poor combustion and ignition enhancement may still be used.

To improve combustion stability, at 322, during reactivation of the cylinders, an ignition energy (of the spark) delivered to the reactivated cylinders may be adjusted for a number of combustion events. In particular, the ignition energy may be increased for a number of combustion events. By increasing the ignition energy over the number of combustion events, the higher ignition energy is advantageously used to clean up the poor combustion. The result is a more stable combustion and less torque disturbances during the reactivation.

The number of combustion events over which the ignition energy is increased may be based on an engine load during the cylinder reactivation. For example, the number of combustion events may be increased until the engine load reaches steady-state conditions. The number of combustion events may be further based on a duration of the selective deactivation, and the temperature of the engine with the number of combustion events increased as the duration of selective deactivation (e.g., duration of operating in the VDE mode) increases. The number of combustion events may also be adjusted based on one or more of an engine temperature, a catalyst temperature, and a cylinder fuel injector tip temperature. In one example, the temperatures may be estimated directly. In an alternate example, the temperatures may be inferred based on the duration of selective deactivation.

A degree of increasing the ignition energy may be adjusted based on an EGR level during the cylinder reactivation. As discussed above, when the cylinders are reactivated, the resulting lighter cylinder load can result in a potential for less stable combustion. The addition of EGR to the cylinder during such conditions can further exacerbate combustion stability. Thus, during cylinder reactivation, EGR control may be performed to decrease or bleed down the EGR. However, until the EGR has bled down, the interaction of the EGR with lighter cylinder load can cause degraded combustion stability. To overcome this issue, during the reactivation, as the EGR level decreases (or bleeds down), the ignition energy may be maintained elevated. By keeping the ignition energy increased during a cylinder reactivation, while EGR is being delivered to the reactivated cylinders, the increased ignition energy can be used to clean up the poor combustion arising from the EGR.

In some embodiments, the number of combustion events may be further based on the EGR level during the cylinder reactivation and the degree of increasing the ignition energy (which is based on the EGR level during the reactivation). For example, the number of combustion events may be increased as the EGR level increases. Herein, the increased ignition energy is prolonged until the EGR has sufficiently bled down. Likewise, the number of combustion events may be decreased as the degree of increasing the ignition energy increases. In other words, for a given amount of EGR available when the cylinders are reactivated, the ignition energy may be increased to a relatively higher level and maintained at the relatively higher level for a shorter duration until the EGR bleeds down. Alternatively, for the given amount of EGR available when the cylinders are reactivated, the ignition energy may be increased to a relatively lower level and maintained at the relatively lower level for a longer duration until the EGR bleeds down.

Increasing the ignition energy of the spark delivered to the engine may include, at 324, increasing an ignition coil dwell timing. As an example, for the number of combustion events following the cylinder reactivation, the ignition coil dwell time may be extended. The ignition coil dwell timing may be increased by maintaining a voltage applied to the ignition coil at a substantially constant value for a longer duration during the reactivation. This longer dwell time increases the primary current that the coil charges to, increasing its stored inductive energy. For example the dwell time might be increased from 2.5 msec to 2.8 msec increasing the peak primary current from 8 amps to 10 amps.

Increasing the ignition energy may additionally, or optionally include, at 326, increasing a number of strikes of the ignition coil for each combustion event. Herein, the higher strike frequency is used to increase a number of sparks output by the ignition coil per combustion event for the determined number of combustion events following the cylinder reactivation. In one example, the strike frequency may be increased from one strike per combustion event to five strikes per combustion event.

The increased ignition energy of spark delivered to the reactivated cylinders may be maintained for the selected number of combustion events since the reactivation. Then, at 328, nominal spark ignition energy may be resumed. Specifically, after the determined number of combustion events, ignition energy to the cylinder may be adjusted based on cylinder load conditions. As such, since the cylinder load is based on engine operating conditions, the ignition energy may be adjusted based on engine speed-load conditions.

In this way, a temporary increase in ignition energy may be advantageously used during a cylinder transition from VDE mode to non-VDE mode to reduce torque disturbances and improve combustion stability. By increasing the ignition energy temporarily, rather than using a high ignition output continuously during the transition, component durability issues resulting from the high heat output are reduced.

Further, the life of spark plug components, such as the ignition electrodes, is prolonged.

In one example, an engine system comprises an engine including a cylinder, a selectively deactivatable fuel injector configured to inject fuel to the cylinder, a spark plug including an ignition coil for delivering spark to the cylinder, and an EGR passage for recirculating exhaust residuals from an engine exhaust to an engine intake. The system may include a controller with computer readable instructions for: during deactivation conditions, selectively deactivating fuel and spark to the cylinder. Then, during reactivation conditions, the controller may selectively reactivate the fuel injector and increase ignition energy delivered to the reactivated cylinder for a number of combustion events since the reactivation. The ignition energy may be increased by increasing a dwell timing of the ignition coil and/or increasing a number of strikes of the ignition coil. The controller may include further instructions for, during the reactivation conditions, bleeding down an amount of EGR delivered to the engine intake, and adjusting the number of combustion events based on a rate of EGR, the number decreased as the rate of EGR decreases.

As such, the EGR bleed down time is not affected by the ignition energy since the bleed down is a function of the manifold filling dynamics, the EGR level, manifold volume, and the rate at which the cylinders are consuming the manifold contents. However, by increasing the ignition energy while the EGR is being bled down, a transition to a lower cylinder load can be advanced without degrading combustion. Alternatively, the transition to cylinder reactivation can be performed at a higher EGR level during the EGR bleed down period than would have been possible without the enhanced ignition output, reducing the delay time before transition to cylinder reactivation.

Figure 4:
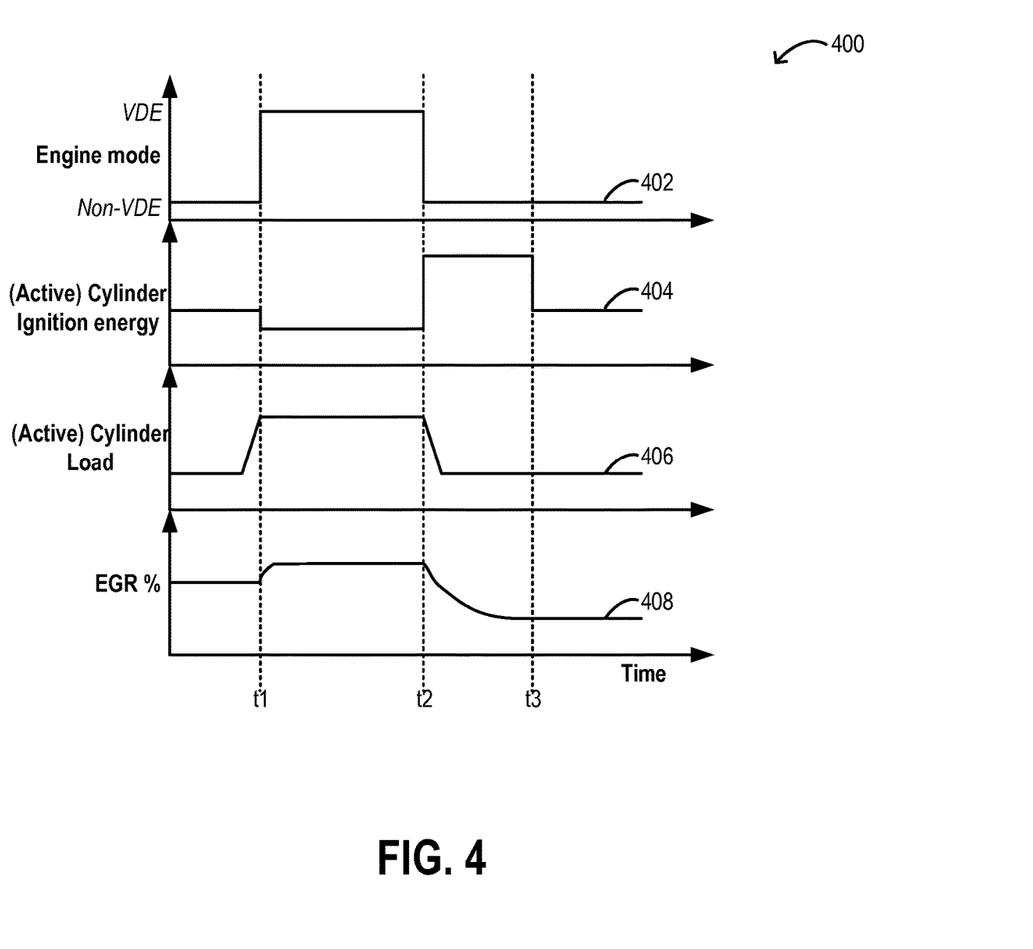
FIG. 4 shows an example adjustment to the output of an ignition coil during a transition from VDE to non-VDE mode of operation.

Now turning to FIG. 4, map 400 depicts an example adjustment to the ignition energy for a cylinder spark event following reactivation of the cylinder from a previous deactivated state. By increasing the ignition energy temporarily during the reactivation, combustion stability and torque disturbances during the mode transition are improved. Map 400 depicts an engine mode (VDE or non-VDE) at plot 402, an active cylinder ignition energy at plot 404, a cylinder load of an active cylinder load at plot 406, and EGR (as a percentage of the cylinder aircharge) at plot 408.

Prior to t1, the engine may be operating in a non-VDE mode with all cylinders active (plot 402). In addition, an amount of EGR may be delivered to the cylinders to maintain a desired engine dilution level (plot 408). At t1, due to a change in engine operating conditions, such as a decrease in driver torque demand, the engine may be shifted to a VDE mode of operation wherein one or more cylinders are selectively deactivated. For example, where the engine is a V-8 engine, four cylinders (e.g., four cylinders coupled on a first bank of the engine) may be selectively deactivated while a remaining four cylinders (e.g., four cylinders coupled on a second bank of the engine) may remain activated. The group of cylinders selected for deactivation may be deactivated by shutting off their fuel injectors, while letting air continue to flow through the intake and exhaust valves. Alternatively, the valves may be selectively deactivated. In addition, the cylinders may receive spark at a nominal ignition energy level (plot 404) that is based on the existing engine speed-load conditions.

As such, following t1, in response to the deactivation, the remaining active cylinders may have their cylinder load increased (see plot 406), for example, via adjustments to the aircharge they receive to compensate for the deactivation. By increasing the cylinder load of the remaining active cylinders, engine torque output is maintained while fuel economy and emission benefits are achieved from the deactivation of selected engine cylinders. Since a higher engine dilution can be tolerated at the higher cylinder load, following the deactivation, the EGR percentage is increased such that the active cylinders receive more exhaust residuals. By increasing the EGR percentage, additional fuel economy and emissions benefits can be achieved. In addition, following t1, the ignition energy level of spark delivered to the active cylinders may be decreased due to a decrease in engine speed-load conditions.

Between t1 and t2, the engine may be operated in the VDE mode with one or more cylinders selectively deactivated, with the individual cylinder load of the active cylinders increased, and the ignition energy of the active cylinders decreased (below the nominal level used prior to the deactivation at t1). At t2, due to a change in engine operating conditions, such as an increase in driver torque demand, the engine may be shifted out of the VDE mode and into a non-VDE mode of operation. Therein, the one or more cylinders that were deactivated are selectively reactivated. With reference to the V-8 engine of the above discussed example, the four cylinders coupled on the first bank of the engine may be selectively reactivated.

As such, following t2, in response to the reactivation, the active cylinders (that is, all the cylinders of the present example) may have their cylinder load decreased (see plot 406), for example, via adjustments to the aircharge they receive to compensate for the reactivation. By decreasing the individual cylinder load, the driver torque demand may be met by the combined output of all the engine cylinders (which are now all active).

Since engine dilution is not well tolerated at the lower cylinder load, following the reactivation, the EGR percentage is decreased such that the cylinders receive gradually less exhaust residuals. In other words, EGR is reduced at a bleed-down rate during the reactivation. However, until the EGR is completely bled down, due to the interaction of the EGR with the cylinder combustion, combustion stability may be adversely affected and misfires may be possible. To address this, during the reactivation, while the EGR percentage is above a threshold (e.g., while there is any EGR), the ignition energy of the cylinders may be increased (plot 404). By increasing the ignition energy for a number of combustion events of the reactivation until the EGR percentage is below the threshold (e.g., until all the EGR has bled down), the increased ignition energy can be used to clean up the poor combustion and improve combustion stability. Then, at t3, when the EGR level is sufficiently low, the ignition energy may be readjusted to a level (e.g., nominal level) that is based on the engine operating conditions (e.g., engine speed-load conditions).

In this way, a degree of increasing the ignition energy is maintained above a threshold degree when the EGR level during the cylinder reactivation is higher than a threshold level. The degree of increasing the ignition energy is then reduced below the threshold degree when the EGR level during the cylinder reactivation falls below the threshold level.

It will be appreciated that while the depicted example illustrated the ignition energy maintained elevated during the reactivation between t2 and t3 until the EGR has sufficiently bled down, in alternate embodiments, the ignition energy level may also be adjusted between t2 and t3 as the EGR level changes. For example, as the EGR level drops during the reactivation, the ignition energy may be gradually reduced.

While the depicted example shows maintaining operation with the increased ignition energy for a number of combustion events since the reactivation (between t2 and t3) based on the EGR level, it will be appreciated that the number of combustion events may be additionally, or optionally based on one or more of, a duration of the immediately previous deactivation (e.g., how long the engine was in the VDE mode before the transition), engine operating temperatures at the reactivation (e.g., engine temperature, catalyst temperature, injector tip temperature, etc.), and an engine load. It will be appreciated that in still further embodiments, the number of events over which the ignition energy is increased, as well as a degree of the increasing (e.g., by how much the ignition energy is increased) may be adjusted based on the EGR level or percentage available at the time of the reactivation and/or the engine operating conditions discussed above (temperature, duration of deactivation, etc.)

In one example, a controller may selectively deactivate one or more engine cylinders in response to operating conditions. Then, during a first reactivation condition, the controller may increase an ignition energy of the reactivated cylinders to a first, higher level for a first, larger number of combustion events. In comparison, during a second reactivation condition, the controller may increase the ignition energy of the reactivated cylinders to a second, lower level for a second, smaller number of combustion events. Herein, during the first reactivation condition, an EGR rate of the engine is higher, while during the second reactivation condition, an EGR rate of the engine is lower.

In the above example, increasing the ignition energy to the first level for the first number of combustion events includes increasing an ignition coil dwell timing by a larger amount and maintaining the increased ignition coil dwell timing for the first number of combustion events. Likewise, increasing the ignition energy to the second level for the second number of combustion events includes increasing the ignition coil dwell timing by a smaller amount and maintaining the increased ignition coil dwell timing for the second number of combustion events.

In another example, increasing the ignition energy to the first level for the first number of combustion events includes increasing a strike frequency of the ignition coil by a larger amount and maintaining the increased ignition coil strike frequency for the first number of combustion events. Likewise, increasing the ignition energy to the second level for the second number of combustion events includes increasing the strike frequency of the ignition coil by a smaller amount and maintaining the increased ignition coil strike frequency for the second number of combustion events.

During the first condition, after the first number of combustion events, the controller may reduce the ignition energy to a nominal level, while during the second condition, after the second number of combustion events, the controller may reduce the ignition energy to the nominal level. Herein, the nominal level may be based on nominal engine speed-load conditions.

In this way, ignition energy can be modulated during a transition in a variable displacement engine. By selectively increasing the ignition energy during reactivation of engine cylinders, the increased ignition energy is used to improve the combustion stability during a transition from VDE mode to non-VDE mode of engine operation. As such, the temporary use of increased ignition energy can render torque disturbances during the transition substantially imperceptible to the vehicle operator, improving vehicle driveability. By increasing the ignition energy temporarily, rather than using a high ignition output continuously during the transition, the impact of the increased ignition energy on the durability of the spark plug components is substantially reduced. As such, this extends the life of spark plug components, in particular the ignition electrodes. Also, increasing the ignition energy during the reactivation it allows a higher rate of EGR to be provided to the cylinders during the immediately preceding deactivation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method for an engine, comprising:
selectively deactivating one or more engine cylinders responsive to operating conditions;
during reactivation of the cylinders, adjusting an ignition energy of the reactivated cylinders for a number of combustion events,
wherein selectively deactivating the one or more engine cylinders includes selectively deactivating a fuel injector of the one or more engine cylinders, and wherein reactivation of the one or more engine cylinders includes reactivating the deactivated fuel injector; and during the selective deactivation, adjusting an ignition energy of active engine cylinders based on engine speed and load conditions of the active engine cylinders.

2. The method of claim 1, wherein adjusting ignition energy includes increasing the ignition energy for the number of combustion events following the cylinder reactivation.

3. The method of claim 2, wherein the number of combustion events is based on an engine load during the cylinder reactivation, the number of combustion events increased until the engine load reaches steady-state conditions.

4. The method of claim 3, wherein the number of combustion events is further based on a duration of the selective deactivation, the number of combustion events increased as the duration of selective deactivation increases.

5. The method of claim 4, wherein a degree of increasing the ignition energy is based on an EGR level during the cylinder reactivation.

6. The method of claim 5, wherein the number of combustion events is further based on the EGR level during the cylinder reactivation, and the degree of increasing the ignition energy, the number of combustion events increased as the EGR level increases, the number of combustion events decreased as the degree of increasing the ignition energy increases.

7. The method of claim 6, wherein the number of combustion events is further based on one or more of an engine temperature, a catalyst temperature, and a cylinder fuel injector tip temperature.

8. The method of claim 7, wherein increasing ignition energy includes increasing an ignition coil dwell timing for the number of combustion events following the cylinder reactivation.

9. The method of claim 8, wherein increasing ignition energy further includes increasing a number of strikes of an ignition coil to increase a number of sparks output by the ignition coil for each combustion event for the number of combustion events following the cylinder reactivation.

10. The method of claim 5, wherein the degree of increasing the ignition energy is maintained above a threshold degree when the EGR level during the cylinder reactivation is higher than a threshold level, the degree of increasing the ignition energy reduced below the threshold degree when the EGR level during the cylinder reactivation falls below the threshold level.

11. A method for an engine, comprising:
selectively deactivating one or more engine cylinders responsive to operating conditions;
during reactivation of the cylinders, adjusting an ignition energy of the reactivated cylinders for a number of combustion events; and
during the selective deactivation, adjusting an ignition energy of active engine cylinders based on engine speed and load conditions of the active engine cylinders.

12. A method for an engine, comprising:
selectively deactivating one or more engine cylinders in response to operating conditions;
during a first reactivation condition, increasing an ignition energy of reactivated cylinders to a first, higher level for a first, larger number of combustion events; and
during a second reactivation condition, increasing the ignition energy of the reactivated cylinders to a second, lower level for a second, smaller number of combustion events.

13. The method of claim 12, wherein during the first reactivation condition, an EGR load of the engine is higher, and wherein during the second reactivation condition, the EGR load of the engine is lower.

14. The method of claim 12, wherein increasing the ignition energy to the first level for the first number of combustion events includes increasing an ignition coil dwell timing by a larger amount and maintaining the increased ignition coil dwell timing for the first number of combustion events, and wherein increasing the ignition energy to the second level for the second number of combustion events includes increasing the ignition coil dwell timing by a smaller amount and maintaining the increased ignition coil dwell timing for the second number of combustion events.

15. The method of claim 12, wherein increasing the ignition energy to the first level for the first number of combustion events includes increasing a strike frequency of an ignition coil by a larger amount and maintaining the increased ignition coil strike frequency to individual combustion events for the first number of combustion events, and wherein increasing the ignition energy to the second level for the second number of combustion events includes increasing the strike frequency of the ignition coil by a smaller amount and maintaining the increased ignition coil strike frequency to individual combustion events for the second number of combustion events.

16. The method of claim 12, further comprising, during the first reactivation condition, after the first number of combustion events, reducing the ignition energy to a nominal level, and during the second reactivation condition, after the second number of combustion events, reducing the ignition energy to the nominal level, wherein the nominal level is based on nominal engine speed-load conditions.

17. An engine system, comprising:
an engine including a cylinder;
a selectively deactivatable fuel injector configured to inject fuel to the cylinder;
a spark plug including an ignition coil for delivering spark to the cylinder;
an EGR passage for recirculating exhaust residuals from an engine exhaust to an engine intake; and
a controller with computer readable instructions for:
during deactivation conditions, selectively deactivating fuel and spark to the cylinder; and
during reactivation conditions, selectively reactivating the fuel injector and increasing ignition energy delivered to reactivated cylinder individual combustion events for a number of engine combustion events since the reactivation.

18. The system of claim 17, wherein the controller includes further instructions for, during the reactivation conditions, bleeding down an amount of EGR delivered to the engine intake, and adjusting the number of engine combustion events based on a rate of EGR prior to reactivation or a level of EGR at the time of reactivation.

19. The system of claim 17, wherein increasing ignition energy includes, for the number of engine combustion events since the reactivation, increasing a dwell timing of the ignition coil and/or increasing a number of strikes delivered to individual combustion events by the ignition coil.

* * * * *